US006931626B2

(12) United States Patent
Sheedy

(10) Patent No.: US 6,931,626 B2
(45) Date of Patent: Aug. 16, 2005

(54) METHOD AND APPARATUS FOR VERSIONING STATICALLY BOUND FILES

(75) Inventor: Christopher R. Sheedy, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 09/764,526

(22) Filed: Jan. 17, 2001

(65) Prior Publication Data

US 2002/0133804 A1 Sep. 19, 2002

(51) Int. Cl.$^7$ ................................................. G06F 9/44
(52) U.S. Cl. ...................... 717/122; 717/163; 717/170; 715/511
(58) Field of Search ........................ 717/122, 162–164, 717/170, 106, 11; 715/511; 395/703, 705, 709, 710; 709/216

(56) References Cited

U.S. PATENT DOCUMENTS

| | | | | |
|---|---|---|---|---|
| 5,266,781 A | * | 11/1993 | Warwick et al. | 235/375 |
| 5,579,509 A | * | 11/1996 | Furtney et al. | 703/27 |
| 5,630,135 A | * | 5/1997 | Orimo et al. | 718/106 |
| 5,649,200 A | * | 7/1997 | Leblang et al. | 717/122 |
| 5,805,899 A | * | 9/1998 | Evans et al. | 717/170 |
| 6,457,170 B1 | * | 9/2002 | Boehm et al. | 717/106 |
| 6,499,137 B1 | * | 12/2002 | Hunt | 717/164 |
| 6,665,735 B1 | * | 12/2003 | Tanaka et al. | 719/331 |

OTHER PUBLICATIONS

"OpenGL—Introduction to 3D", Accessed online Mar. 1, 2005 at <http://www.falloutsoftware.com/tutorials/gl/gl0.htm>.*

Vaughn et al., "GNU Autoconf, Automake, and Libtool", Oct. 2000, New Riders publishing, Section 11.4, Accessed and printed online on Mar. 1, 2005 at <http://sources.redhat.com/autobook/>.*

Fowler et al., "Principles for writing reusable libraries", Aug. 1995, Proceedings of the 1995 Symposium on Software reusability, pp.: 150–159, ISSN:0163–5948.*

Hollingsworth and Miller, "Using content–derived names for configuration management", May 1997, Proceedings of the 1997 symposium on Software reusability, pp.: 104–109, ISBN:0–89791–945–9.*

Steve Chamberlain, "Using Id: The GNU Linker", Jan. 1994, Free Software Foundation, pp. 38–40.*

Stephen R. Schach "Software Engineering", Richard D. Irviw, Inc., and Aksen Associates, Inc., 1990. pp. 59–60, 257.*

"Separate Compilation and the UNIX make Program", www.d.umn.edu/~gshute/make/makedoc.html by Gary Shute Sep. 22, 1999.*

* cited by examiner

*Primary Examiner*—Wei Y. Zhen
*Assistant Examiner*—J. Derek Rutten

(57) ABSTRACT

A method of storing version and product information of libraries used in the building of an executable file. For each library, a source file containing the version and product information is constructed, compiled and the resulting version object file is stored in the library. When the build of an executable occurs, the version object file for each of the libraries needed for the build is obtained and stored in a temporary area. A list is made of the names of the stored version object files and, when the executable is compiled, the list is submitted to the compiler command so that the version object files of each library are compiled into the executable file. In one alternative, a compound library formed from a selected set of libraries can be compiled into the executable. A utility program can be used to retrieve the stored version and product information in the executable.

17 Claims, 7 Drawing Sheets

```
/usr/bin/prog_a
GMT Binder timestamp: 21JUL2000 17:18:06
     Version procedure: T0123V01_30SEP2000_20Jul2000
     Version procedure: T1111V01_30SEP2000_09Jul2000_X    } 40
     Version procedure: T2222V02_30SEP2000_19Jul2000_Y
     Version procedure: T8432D44_01DEC97_CRTLMAIN
           Native Mode: runnable file
```

METHOD AND APPARATUS FOR VERSIONING STATICALLY BOUND FILES

CROSS-REFERENCE TO RELATED APPLICATIONS

1. Field of the Invention

This invention relates generally to the management of component files used in the compilation of an executable program and more specifically to the management of version information for library files that are statically bound in the compilation of the executable program.

2. Description of the Related Art

Software developers are often faced with the task of constructing new builds of software systems that involve sometimes hundreds or even thousands of component files. For building software systems in the UNIX or UNIX-like environment, it is common to construct a software system object file (the final executable file) by an invocation of the C compiler in which a string variable specifies a long list of the component files that must be compiled or linked to create the executable. Many of the component files used to build the software system are kept in one or more libraries and it is common for several versions of these libraries to be present and available to support the build process for multiple software systems. Often a particular software system requires a version of a library that was developed especially for the particular software system.

A common way of building a software system is to compile (as used herein the term compiling includes linking and may cause only linking to occur if only object files are specified) the files of one or more libraries directly into the final executable file for the system (otherwise known as statically binding the files that make up the final executable file). However, once the final executable file has been created, it is difficult to identify exactly which version of the library was used to construct the system. Out-of-date or incorrect versions of these libraries may cause the system to behave incorrectly, often in mysterious ways. Also, software support personal may want to verify that the version of a library that was used in a build matches the latest released version of the library.

Thus, there is a need for a method of identifying the version of one or more libraries that are used to build a software system to help determine whether the versions of the one or more libraries used were correct for that software system.

BRIEF SUMMARY OF THE INVENTION

The present invention is directed towards such a need. A computerized method of saving version and product information of a library in an executable program, in accordance with the present invention, includes creating a version source file for the library, where the version source file contains version and product information pertaining to the library. Next, the version source file is compiled to create a version object file, following which the library is rebuilt to include the version object file. The executable program is then built so as to include the version object file of the library such that the version and product information is combined into the executable program.

In one embodiment, a compound library is formed from a selected group of libraries, each of which has a version object file. The compound library contains the object files of the selected group, including the version object files of each library in the selected group, and a version object file for the compound library. When the compound library is included in the build of the executable, the executable has the version information for each library in the selected group and the version information for the compound library itself.

One advantage of the present invention is that it is possible to identify the version of a library that was used to build a software system and whether the correct library was used for the build.

Another advantage is that subtle software errors that are caused by using an outdated or incorrect library can be traced.

Yet another advantage is that software releases can be made more reliable because the component files used in the build can be checked prior to release to assure that they are the correct and up-to-date component files.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE PREFERRED EMBODIMENTS

Figure 1:
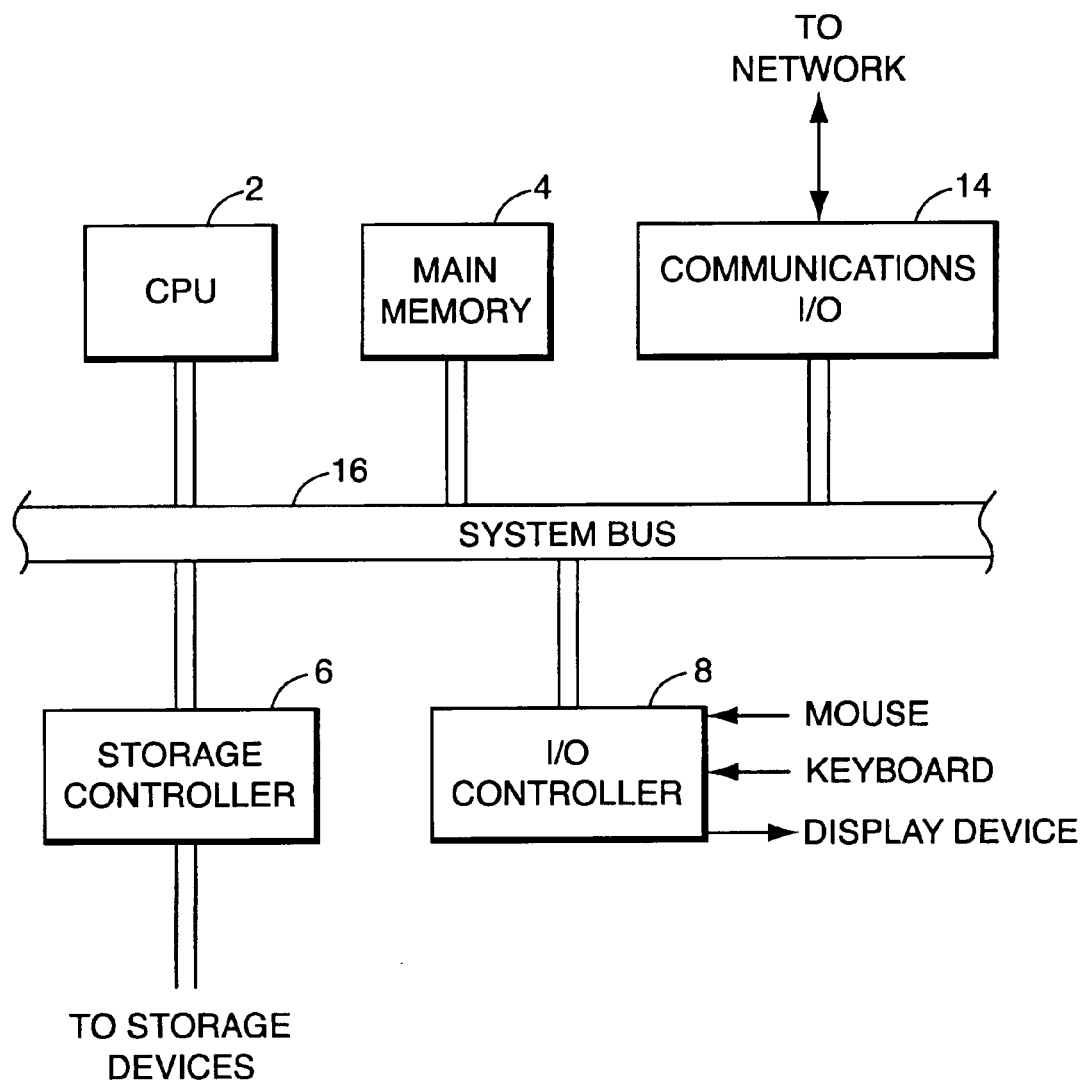
FIG. 1 shows a typical computer system for storing and executing the processes of the present invention.

FIG. 1 shows a typical computer system for storing and executing the processes of the present invention. Central processing unit 2, main memory 4, storage controller 6, I/O controller 8, and communications controller 14 are interconnected via system bus 16. Main memory 4 contains programs which are executed by central processing unit 2. The storage controller 6 transfers programs and data from external storage devices to and from main memory 4. External storage devices may hold libraries, compilers and other programs that pertain to the present invention. Libraries and other programs are brought in to the memory as they are needed by a currently executing program. The I/O controller 8 couples information from mouse and keyboard devices to the central processing unit 4 and communications I/O 14 connects the central processing unit and the main memory to an external communications medium such as a local area network.

Figure 2:
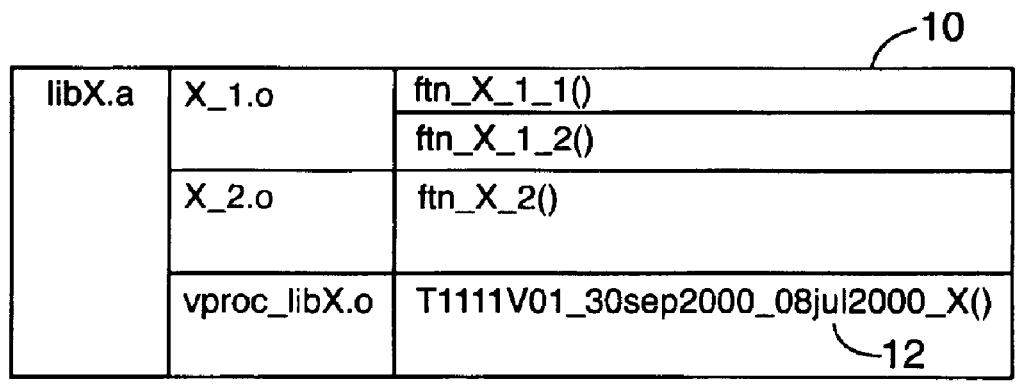
FIG. 2 shows a first library file (libX.a) that comprises three object files, one of which is the version information file for the first library.

FIG. 2 shows a first library file (libX.a) 10 that comprises three object files, one of which is the version information file for the first library. The first object file, X_1.o, in the library contains two functions, ftn_X_1_1 ( ) and ftn_X_1_2 ( ). The second object file, X_2.o, contains one function, ftn_X_2 ( ), and the third object file, vproc_libX.o, contains a version function 12, T1111V01_30sep2000_08jul2000_X ( ), to indicate that library libX.a is part of product T1111, version V01, having a customer release date of Sep. 30, 2000 and a build date of Jul. 8, 2000. A utility (such as an archive command, ar-t libX.a, in the UNIX environment) can be used to list these three component object files of the libX.a library.

Figure 3:
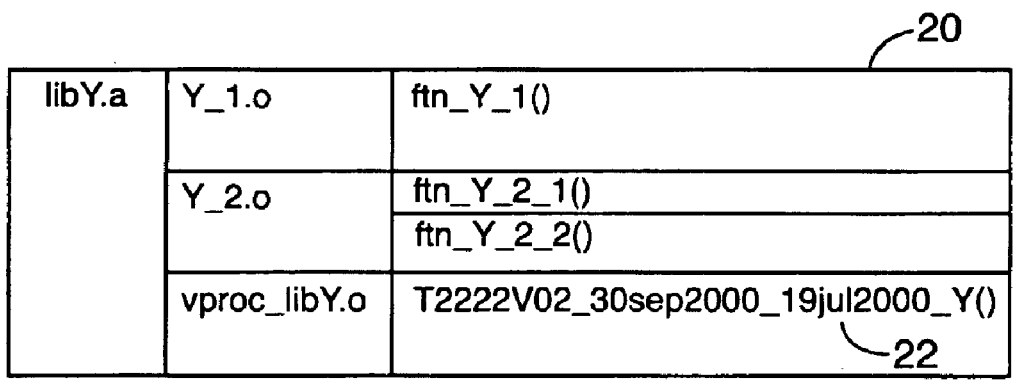
FIG. 3 shows a second library file (libY.a) that comprises three object files, one of which is a version information file for the second library.

FIG. 3 shows a second library file (libY.a) 20 that comprises three object files, one of which is a version information file for the second library. File Y_1.o, the first object file, contains function ftn_Y_1 ( ). The second object file, Y_2.o, in the library contains two functions ftn_Y_2_1 ( ) and ftn_Y_2_2 ( ). The third file object file, vproc_libY.o, contains a version function 22, T2222V02_30sep2000_19jul2000_Y ( ), to indicate that library libY.a is part of product T2222, version V02, having a customer release date of Sep. 30, 2000 and a build date of Jul. 19, 2000. A command (such as an archive command, ar-t libY.a, in the UNIX environment) can be used to list these three component object files of the libY.a library.

Figures 4, 5:
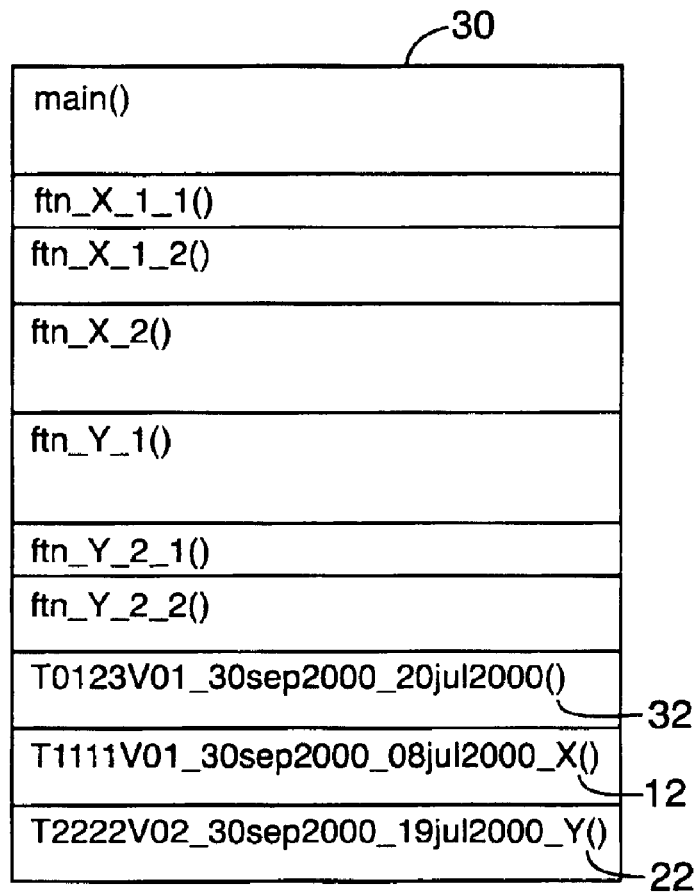
FIG. 4 shows an executable object file for a particular software system which is built with the first and second libraries and includes the version information for the first and second libraries as well as the version information for the software system itself.
FIG. 5 shows the listing after running a utility program on the executable object file of FIG. 4 to list the component object files used to create the executable object file.

FIG. 4 shows an executable object file 30 for a particular software system which is built with the first and second libraries and includes the version information for the first and second libraries as well as the version information for the software system itself. The executable object file 30 includes the functions from each of the libraries, libX.a and libY.a, and each of the version functions 12, 22 from those libraries, along with a version function 32, T0123V01_30sep2000_20jul2000 ( ), for the executable object file itself.

FIG. 5 shows the listing 40 after running a utility program on the executable object file of FIG. 4. When the utility program is run with the executable object file as an argument, it lists the version functions for each of the libraries and each additional version function or procedure contained in the file. Thus, if the utility program is run on the object file of FIG. 3, the relevant output is:

| Version procedure: | T0123V01_30SEP2000_20JUL2000 |
| Version procedure: | T1111V01_30SEP2000_09JUL2000_X |
| Version procedure: | T2222V02_30SEP2000_19JUL2000_Y |
| Version procedure: | T8432D44_01DEC1997_CRTLMAIN |

The first line of the output indicates the version information for the executable object file, while the second and third lines indicate the version information for the library files, libX.a and libY.a. The last line indicates the version of function main ( ) from the C Runtime Library that was statically linked into the executable. This information allows one to determine which versions of the component files were used to construct the executable object file and whether the correct component files were used because the product and version information and the build identifier are included in the version functions. In some embodiments, only the product and version information without the build identifier are included.

To build an executable having version functions, two major steps are required. First, a version function must be created and stored into each respective library in a way that makes finding that version function possible. Second, when the library is used in a compilation to create a final executable, the version function for that library must be obtained and included in the compilation. In some embodiments, a compound library is formed from two or more libraries, each of which has a version object file. In addition the compound library has its own version object file. These steps make it possible to determine the particular libraries that were used in compiling a particular final executable by examining the version functions stored in the executable.

Figure 6:
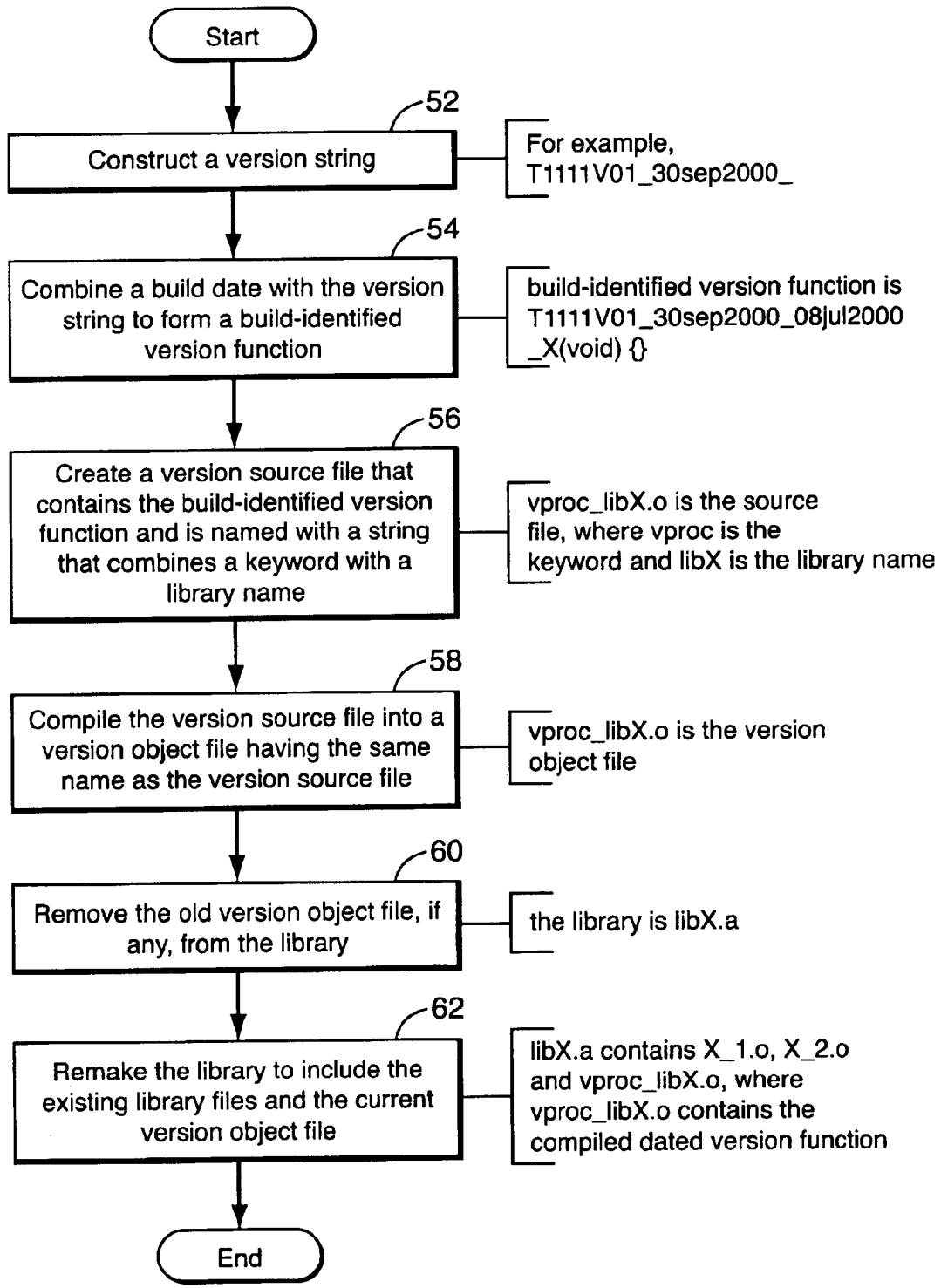
FIG. 6 shows a flow chart for creating and storing the version information file for a library.

FIG. 6 shows a flow chart for the first major step in accordance with a preferred embodiment of the present invention. First, in step 52, a version string is formed, for example, T1111V01_30sep2000. Next, in step 54, a build identifier is combined with the version string and function symbols to convert the string into a build-indicated, version function, (a void function with an empty body is preferred but not essential to the invention; a non-void and/or non-empty function with identifying strings or text in its body is within the scope of the present invention). In the preferred embodiment, the build identifier (shown as a build date) is appended to the version string and the function symbols are appended to the resulting string to form the build-identified version function. The build identifier, in step 54, includes any mark that can serve to distinguish one build from another build. Preferably, the build identifier is a build date character string, but a unique build number or a user id can serve equally well as a distinguishing mark. In some embodiments a build identifier is not appended to the version string. In step 56, a version source file is created. This source file, vproc_libX.c, contains the build-indicated version function (or just the version function, if no build identifier is used) and has a name, vproc_libX, that is formed from the combination of a keyword ('vproc' in this case) and the name of the library (without the '.a' extension) at issue, 'libX'. In the preferred embodiment, the library name is appended to an underscore after the keyword. In step 58, the version source file is compiled into an object file, vproc_libX.o, having the same name (notwithstanding the file extension) as the version source file. In the directory, in step 60, any old version object file is removed from the library and a new library is made, in step 62, that includes the other object files in the library and the current version object file. This guarantees that the library is indeed consistent with the build-identified version function.

Figure 7:
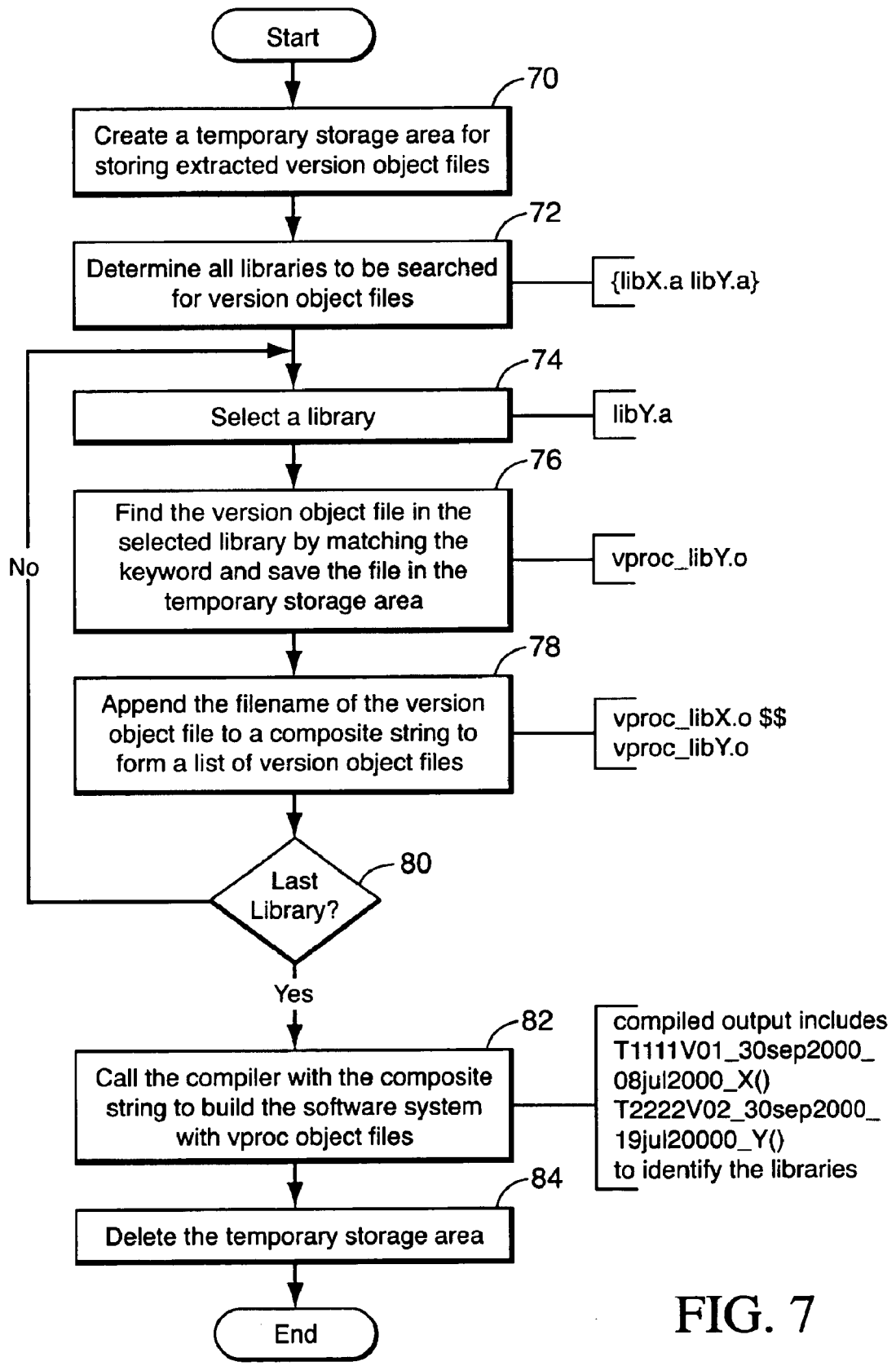
FIG. 7 shows a flow chart for building a software system in which the versioning information from each of the libraries is accessed and included in the build.

FIG. 7 shows a flow chart for the second major step. A temporary storage area, such as a temporary directory, is made, in step 70, to store extracted version object files. Next, in step 72, a list of all the libraries (libX.a and libY.a, in the example of FIG. 4) that are to be used in a new build is constructed and, in step 74, one of the libraries is selected. For that library (libY.a in the example) the version object file (vproc_libY.o) is found, in step 76, by matching the keyword, vproc, in a listing of the contents of the library. In an embodiment in which a compound library is used, all version object files in the compound library are matched. The found version object file (vproc_libY.o) is saved in the temporary storage area. In step 78, the version object file is appended to a composite string variable and, as determined in step 80, the loop continues until each of the libraries has been searched for its version object file. After the loop ends, the composite string variable contains a space separated list (vproc_libX.o vproc_libY.o) of the version object files for the libraries to be used in the build and the temporary storage area contains these files. Finally, in step 82, the compiler is called to perform the build using the composite string variable to specify all of the version object files and in step 84, the temporary storage area is deleted.

The result is that the version object files have their contents, the version functions, compiled into the build so that the executable appears, as in FIG. 4, with the version functions.

Figure 8:
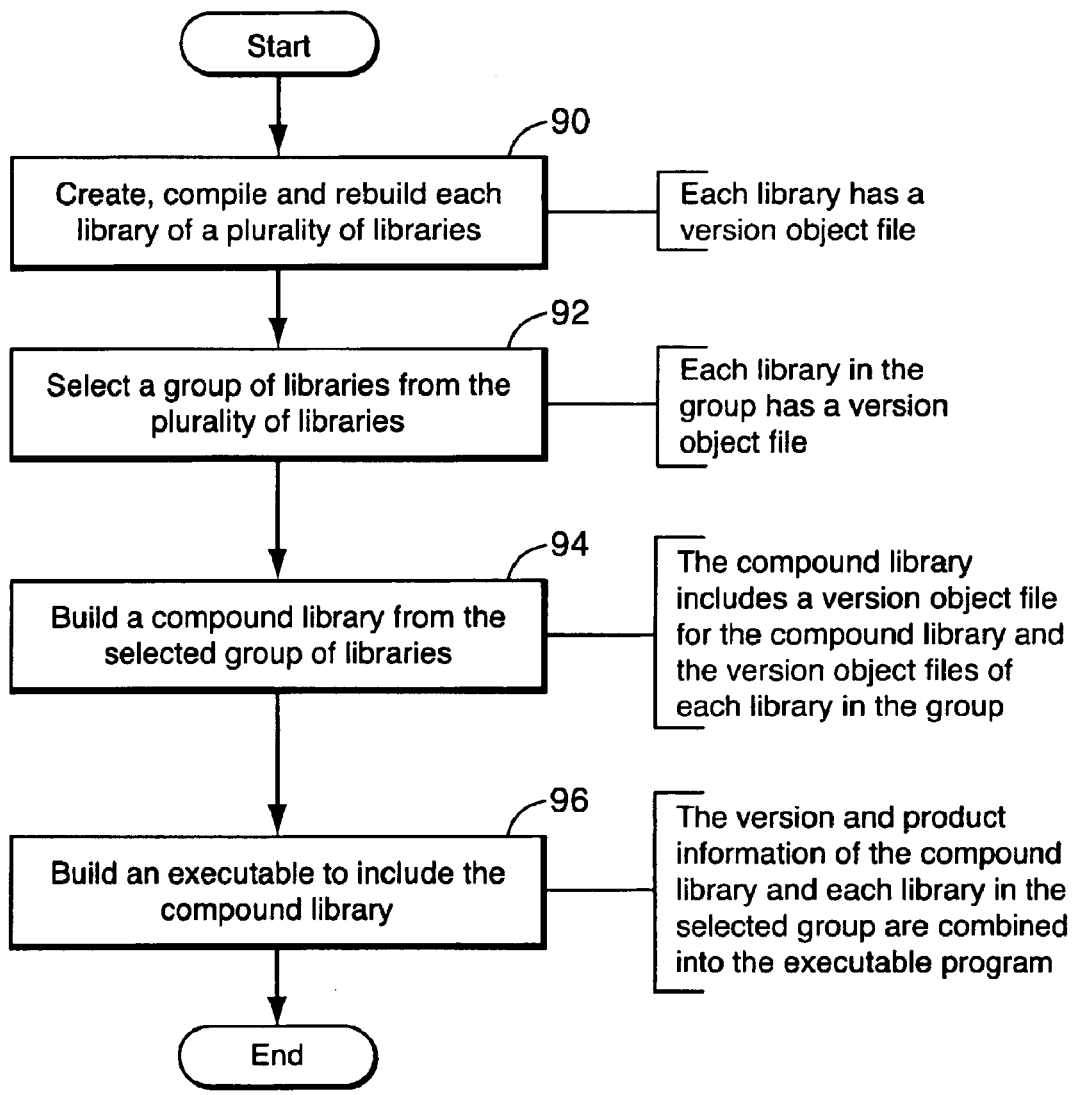
FIG. 8 shows a flow chart for building an executable to include a compound library.

FIG. 8 shows a flow chart for building an executable to include a compound library. A compound library is a library formed from a selected group of libraries out of a plurality of libraries. Each of the plurality of libraries has a version object file that was placed in the library, in step 90, and in accordance with the flow of FIG. 6. In step 92, a group of libraries is selected to make the compound library and, in step 94, the compound library is built from the selected group. Finally, in step 96, the executable is built specifying the compound library. The result is that the executable includes the version and product information about each library in the selected group and version and product information for the compound library itself.

Figure 9:
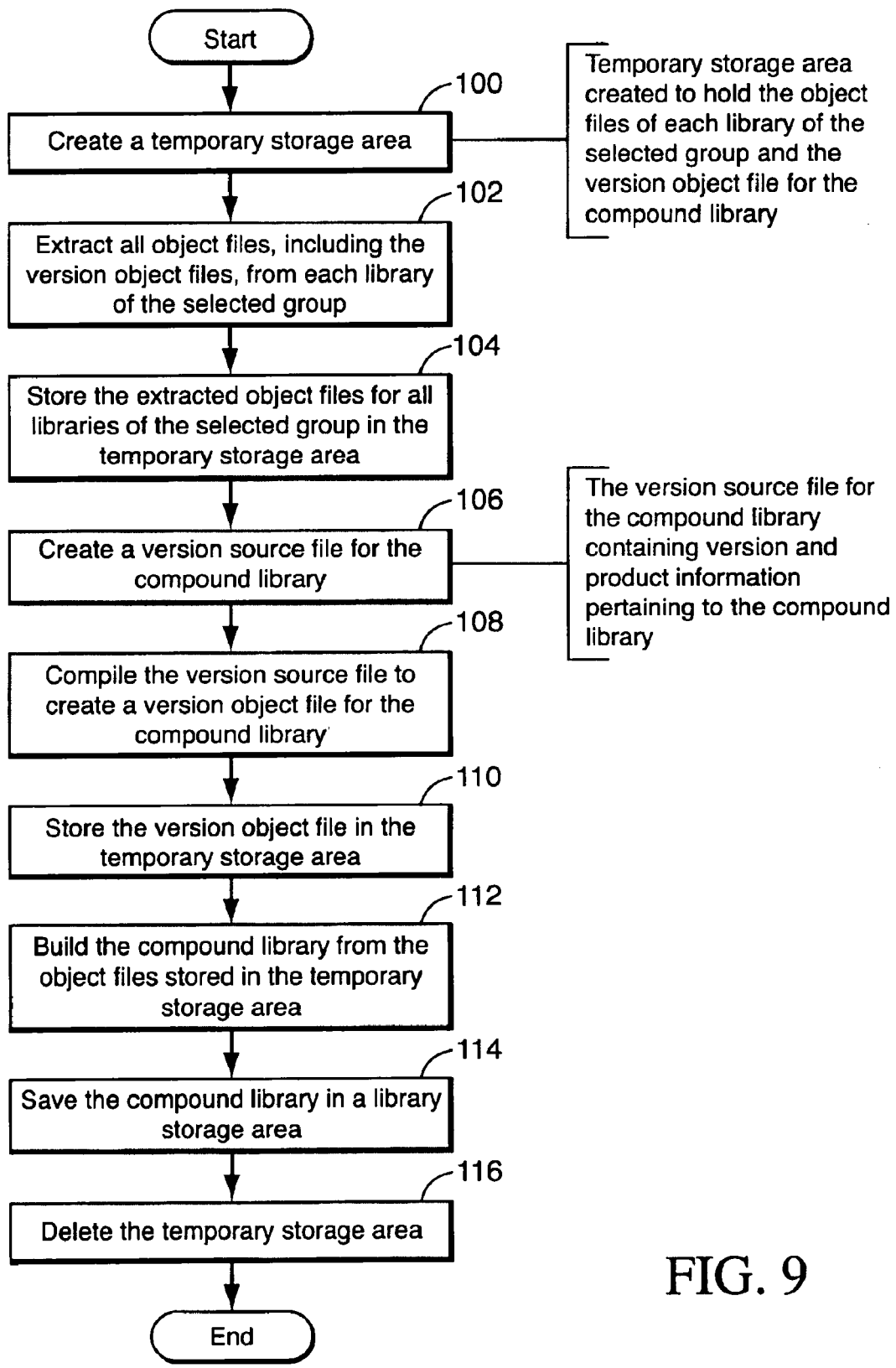
FIG. 9 shows a flow chart for creating a compound library.

FIG. 9 shows a flow chart for creating a compound library. First, in step 100, a temporary storage area is created for holding the object files for each library in the selected group. Next, in step 102, all object files, including the version object files, are extracted from each library in the selected group and, in step 104, the extracted files are stored in the temporary storage area. In step 106, a version source file is constructed for the compound library, in accordance with the flow of FIG. 6, and, in step 108, the version source file for the compound library is compiled to create a version object file for the compound library and this version object file is then stored, in step 110, in the temporary storage area. In step 112, the compound library is built using the files from the temporary storage area and the compound library is saved, in step 114, in a library storage area. Finally, in step 116, the temporary storage area is deleted.

Although the present invention has been described in considerable detail with reference to certain preferred versions thereof, other versions are possible. For example, in one alternative version, the plurality of libraries includes compound and non-compound libraries such that the flow of FIG. 9 builds a multiple compound library, which includes at least one other compound library, when a compound library is in the selected group of libraries.

Therefore, the spirit and scope of the appended claims should not be limited to the description of the preferred versions contained herein.

What is claimed is:

1. A computerized method of saving version and product information of a library in an executable program, comprising:
   creating a version source file, the version source file containing a version function whose name comprises at least one of version information and product information of the library;
   compiling the version source file to create a version object file;
   rebuilding the library to include the version object file; and
   building the executable program such that the version function whose name comprises at least one of version information and product information of the library is combined into the executable program.

2. A method of saving as recited in claim 1, wherein the step of creating the version of the source file further comprises:
   constructing a version string, the version string containing version and product identification information pertaining to the library;
   combining function symbols with the version string to form a version function;
   creating a version source file whose name includes a keyword and the name of the at least one library; and
   storing the version function in the version source file.

3. A method of saving as recited in claim 1, wherein creating the version source file further comprises:
   constructing a version string containing version and product identification information pertaining to the library;
   combining a build identifier and function symbols with the version string to form a name of the version function;
   creating a version source file whose name includes a keyword and the name of the library; and
   storing the version function in the version source file.

4. A method of saving as recited in claim 3, wherein the build identifier is a date on which the build occurs.

5. A method of saving as recited in claim 3, wherein the build identifier is a number that uniquely identifies the build.

6. A method of saving as recited in claim 3, wherein the build identifier of a user that performs the build.

7. A method of saving as recited in claim 1, wherein rebuilding the library further comprises:
   removing any version object file from the library; and
   remaking the library to include the version object file.

8. A method of saving as recited in claim 1, wherein building the executable includes:
   creating a temporary storage area;
   obtaining the version object file from the library, the version object file having a name that includes a keyword and the name of the library in which the version object file resides;
   storing the version object file in the temporary storage area; and
   compiling into the executable the stored version object file so that the executable contains the version and product information pertaining to the library.

9. A method of saving as recited in claim 1,
   wherein there is a plurality of libraries; and
   wherein creating, compiling and rebuilding are performed for each library of the plurality of libraries.

10. A method of saving as recited in claim 9,
    further comprising, prior to the building step, selecting from the plurality of libraries a group of libraries needed for the building of the executable, each library in the group having a version object file; and
    wherein building the executable includes:
       creating a temporary storage area;
       obtaining the version object file from each of the selected libraries, each version object file having a name that includes a keyword and the name of the library in which the version object file resides;
       storing each of the version object files in the temporary storage area;
       creating a list of the names of the stored version object files; and
       compiling into the executable each of the stored version object files in the list so that the executable contains any functions needed by the executable from each library in the group and the version and product information of each library of the group.

11. A method of saving as recited in claim 9,
    further comprising, prior to the building of the executable, selecting a group of libraries from the plurality of libraries, each library in the group having a version object file; and building a compound library from the selected group of libraries, the compound library including a version object file for the compound library and the version object files of each library in the group; and wherein building the executable includes building an executable to include the compound library, such that the version and product information of the compound library and each library in the selected group are combined into the executable program.

12. A method of saving as recited in claim 11, wherein building a compound library further comprises:

creating a temporary storage area for holding the object files of each library of the selected group and the version object file for the compound library;

extracting all object files, including the version object files, from each library of the selected group;

storing the extracted object files for all libraries of the selected group in the temporary storage area;

creating a version source file for the compound library, the version source file for the compound library containing version and product information pertaining to the compound library;

compiling the version source file to create a version object file for the compound library;

storing the version object file in the temporary storage area;

building the compound library from the object files stored in the temporary storage area;

saving the compound library in a library storage area; and deleting the temporary storage area.

13. A method of saving as recited in claim 9, further comprising, prior to the building of the executable, selecting a group of libraries from the plurality of libraries, the group including at least one compound library, and each library in the group having at least one version object file; and building a multiple compound library from the selected group of libraries, the multiple compound library including a version object file for the multiple compound library and the version object files of each library in the group; and wherein building the executable includes building an executable to include the multiple compound library, such that the version and product information of the multiple compound library and each library in the selected group are combined into the executable program.

14. A computer implemented method comprising:

creating source code file containing a function whose name comprises version information of a library;

compiling the source code file to create an object file placed within the library; and building an executable program using at least the function from the library such that the version information is contained in the executable program through the presence of the function.

15. The computer implemented method as defined in claim 14 further comprising creating the source code file containing a void function with an empty body.

16. The computer implemented method as defined in claim 14 further comprising creating the source code file containing a non-void function with text in the body.

17. The computer implemented method as defined in claim 14 further comprising creating the source code file containing the function whose name also comprises product information, and wherein the product information is contained in the executable program through the presence of the function.

* * * * *